United States Patent
Xing et al.

(10) Patent No.: US 9,883,530 B2
(45) Date of Patent: Jan. 30, 2018

(54) RADIO FRAME RECEIVING METHOD AND DEVICE

(71) Applicant: ZTE Corporation, Shenzhen (CN)

(72) Inventors: Weimin Xing, Shenzhen (CN); Kaiying Lv, Shenzhen (CN); Bo Sun, Shenzhen (CN); Kaibo Tian, Shenzhen (CN); Jing Jiang, Shenzhen (CN); Zhiqiang Han, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 195 days.

(21) Appl. No.: 14/396,657

(22) PCT Filed: Dec. 26, 2012

(86) PCT No.: PCT/CN2012/087539
§ 371 (c)(1),
(2) Date: Oct. 23, 2014

(87) PCT Pub. No.: WO2013/159552
PCT Pub. Date: Oct. 31, 2013

(65) Prior Publication Data
US 2015/0117343 A1 Apr. 30, 2015

(30) Foreign Application Priority Data
Apr. 23, 2012 (CN) .......................... 2012 1 0121333

(51) Int. Cl.
*H04W 74/08* (2009.01)
*H04W 52/02* (2009.01)
(Continued)

(52) U.S. Cl.
CPC ....... *H04W 74/08* (2013.01); *H04W 52/0238* (2013.01); *H04W 74/0816* (2013.01);
(Continued)

(58) Field of Classification Search
None
See application file for complete search history.

(56) References Cited

U.S. PATENT DOCUMENTS

| 8,724,469 B2 | 5/2014 | Verma et al. |
| 2005/0226204 A1 | 10/2005 | Uehara |

(Continued)

FOREIGN PATENT DOCUMENTS

| CN | 1930824 | 3/2007 |
| CN | 101394626 | 3/2009 |

(Continued)

*Primary Examiner* — Christopher Crutchfield
*Assistant Examiner* — Alan Lindenbaum
(74) *Attorney, Agent, or Firm* — Diederiks & Whitelaw, PLC (57) ABSTRACT

Disclosed are a method and device for receiving the radio frame. The method comprises: a first functional entity of a station detects that a channel signal intensity reaches a preset threshold, and the first functional entity starts receiving a radio frame and sends an indication that a channel detection result is busy to a second functional entity of the station; the first functional entity determines that the station is not a target station for receiving the radio frame, and sends an indication of ending up receiving the radio frame to the second functional entity; and when transmission of the radio frame ends, the first functional entity sends an indication that the channel detection result is idle to the second functional entity. The disclosure provides a reception operation processing procedure of a station having the function of discarding the radio frame while not updating a network allocation vector (NAV).

14 Claims, 6 Drawing Sheets

(51) Int. Cl.
*H04W 16/14* (2009.01)
*H04W 84/12* (2009.01)

(52) U.S. Cl.
CPC ............ *H04W 16/14* (2013.01); *H04W 84/12* (2013.01); *Y02B 60/50* (2013.01)

(56) References Cited

U.S. PATENT DOCUMENTS

| | | | |
|---|---|---|---|
| 2005/0266852 A1 | 12/2005 | Kitamura | |
| 2006/0280153 A1* | 12/2006 | Kwon | H04W 74/0808 370/338 |
| 2008/0186890 A1* | 8/2008 | Shao | H04W 52/0225 370/311 |
| 2009/0279524 A1* | 11/2009 | Yu | H04W 74/0833 370/338 |

FOREIGN PATENT DOCUMENTS

| | | |
|---|---|---|
| CN | 101754242 | 6/2010 |
| WO | WO 2006/115999 | 11/2006 |

\* cited by examiner

RADIO FRAME RECEIVING METHOD AND DEVICE

CROSS-REFERENCET TO RELATED APPLICATIONS

This application represents a National Stage of PCT/CN2012/0087539 filed on Dec. 26, 2012 which claims priority to Chinese Application No. 201210121333.0, filed on Apr. 23, 2012. The entire disclosure of each of the above applications is incorporated herein by reference.

TECHNICAL FIELD

The disclosure relates to the field of communications, in particular to a method and device for receiving the radio frame.

BACKGROUND

At present, in the field of wireless network, with the rapid development of the Wireless Local Area Network (referred to as WLAN for short), the requirement for the WLAN coverage is increasing and the requirement for the throughput is also higher and higher. A series of most common WLAN technical standards such as 802.11a, 802.11b and 802.11g are successively defined in the 802.11 group of the Institute for Electrical and Electronic Engineers (referred to as IEEE for short). Then other task groups appear successively, which work toward developing the standards relating to the existing 802.11 technical improvements, for example, the 802.11n task group proposes the requirement for high throughput (referred to as HT for short), introducing Multiple Input Multiple Output (referred to as MIMO for short) and beam forming technologies, and supporting a data rate of up to 600 Mbps; and the 802.11ac task group further proposes the concept of Very High throughput (referred to as VHT for short) with the data rate being able to arrive at more than 1 Gbps by introducing technologies such as greater channel bandwidth, higher order MIMO and multi-user multiple input multiple output (MU-MIMO). In addition, the main task of the newly established 802.11ah task group is to amend and enhance the Media Access Control layer (referred to as MAC for short) and the Physical Layer Protocol (referred to as PHY for short) of WLAN so as to adapt same for the requirements of networks such as Smart Grid, Environmental/Agricultural Monitoring and Industrial Process Automation.

In the WLAN, a Basic Service Set (referred to as BSS for short) is constituted of an Access Point (referred to as AP for short) and a plurality of Stations (referred to as STA for short) associated with the AR 802.11 defines two operation modes: Distributed Coordination Function (referred to as DCF for short) and Point Coordination function (referred to as PCF for short), and the improvements of these two operation modes: Enhanced Distributed Channel Access function (referred to as EDCA for short) and Hybrid Coordination Function Controlled Channel Access function (referred to as HCCA for short), wherein the DCF is the most fundamental operation mode which uses a CSMA with Collision Avoidance mechanism (referred to as CSMA/CA for short) to enable multiple stations to share a wireless channel. Whereas EDCA is an enhanced operation mode which uses the CSMA/CA mechanism to enable multiple different priority queues to share a wireless channel and reserves a transmission opportunity (referred to as TXOP for short), wherein the different priority queues are referred to as Access Category (referred to as AC for short). In a competition access mechanism, a station waits for an interframe space plus a random backoff time to detect the channel, only when the channel is idle throughout the above-mentioned waiting time, the station can access the channel; if the station starts channel access competition after accurately receiving a packet, then the interframe space of the above-mentioned waiting time is a common interframe space, wherein the common interframe space is DIFS (DCF interframe Space) under DCF and is AIFS (Arbitration Interframe Space) under EDCA; or if the station starts channel competition access after inaccurately receiving a packet, then the above-mentioned interframe space is an extended interframe space which equals a normal interframe space used after accurately receiving plus a short interframe space, and then further plus a predefined response frame transmission time, wherein the short interframe space is an interframe space used when a target recipient needs to response immediately after receiving the radio frame transmitted to itself.

Figure 1:
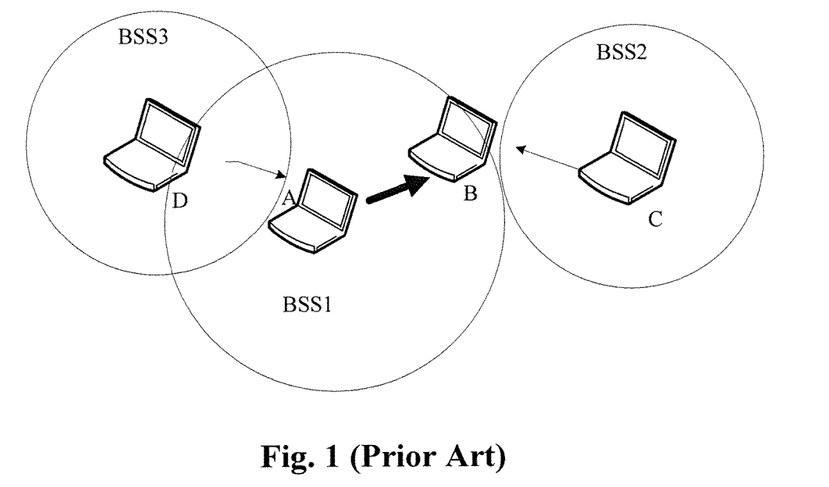
FIG. 1 shows a diagram of hidden stations according to an embodiment of the disclosure.
Figure 2:
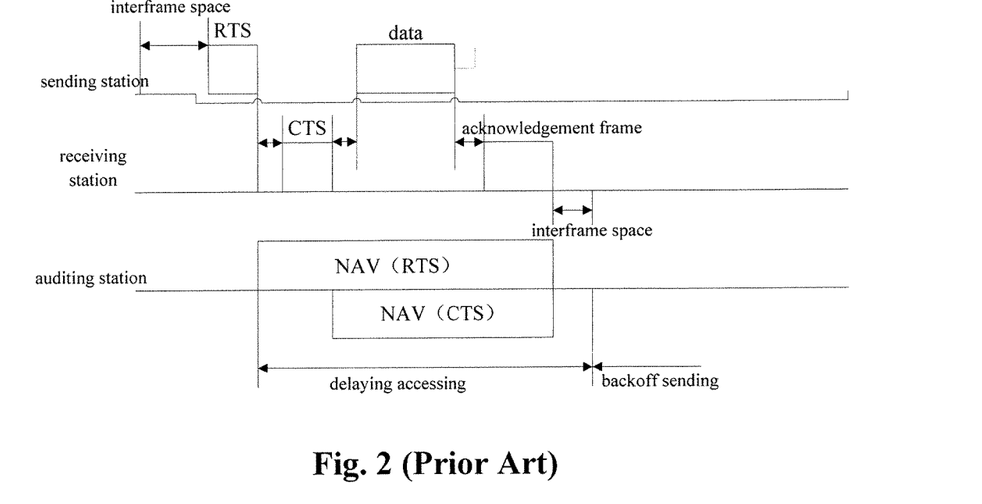
FIG. 2 shows a diagram of setting an NAV according to an embodiment of the disclosure.

When multiple wireless stations sharing the channel, it becomes very difficult to detect collisions of the wireless environment with one big problem thereof being hidden stations (as shown in FIG. 1). In an example of FIG. 1, a station A sends data to a station B, meanwhile, a station C also sends data to a station B; since C and A are both located outside the coverage range of each other, the station A and the station C sending simultaneously will result in a collision, and cause the station B to be unable to accurately receive data. Seen from a perspective of the station A, the station C is a hidden station. In order to solve the problem of hidden stations, 802.11 proposes a virtual channel detection mechanism, that is, reservation channel time information is contained in the frame header of a radio frame, other auditing stations which receive the radio frame containing the time reservation information set a locally stored Network Allocation Vector (referred to NAV for short), wherein the NAV value is set to be the maximum of the above-mentioned time reservation information, and the auditing stations will not send data within this time period so as to avoid the collisions caused by the hidden nodes competing for the channel. And other stations can send data only after the NAVs thereof decrease to zero. For example, a sender sends a Request To Send frame (referred to as RTS for short) to reserve the channel, wherein the RTS contains the channel reservation time information; and a recipient responds with a Clear To Send frame (referred to as CTS for short) to acknowledge the channel reservation, wherein the CTS also contains the channel reservation time information so as to ensure that the sender is capable of accomplishing the subsequent data frame switching. The setting of NAV is shown in FIG. 2, a general data frame switching process comprises a sender sending a data frame and a target recipient responding with a response frame after receiving successfully; and the channel time NAV reserved by the RTS/CTS may contain a time for multiple frame switching processes. In addition, the data frame and the response frame may also contain the channel reservation time information, for example, a data frame may be directly sent without using the channel time reserved by the RTS/CTS, wherein the data frame and the response frame thereof carry the channel reservation time, and the reservation time information of the data frame at least contains the transmission time of the response frame of this frame switching, and may also contain the time for subsequent frame switching.

In the WLAN, a radio frame generally contains a PHY Protocol Data Unit (referred to as PPDU for short) and a PHY Service Data Unit (referred to as PSDU for short), and in the issued Wireless Local Area Network technical standards, the PPDU only contains a training sequence and a signalling indication, e.g., an indication of modulation and coding scheme, which are necessary for decoding the PSDU. However, in the Wireless Local Area Network standards which are in the establishment, partial identification information of the recipient is added in the PPDU; when an STA detects a PPDU and the PPDU of the frame indicates that this STA cannot be the recipient of the frame, the STA may give up receiving the PEW Service Data Unit of the PPDU, where the setting value of the NAV is in the PHY Service Data Unit, then giving up receiving the PPDU, the STA will not update the NAV thereof. The main purpose of doing this is to avoid the STA decoding data packets irrelevant to itself so as to save station power; wherein the above-mentioned partial identification information of the recipient mainly refers to partial relevant identification information (Partial AID) and group identification information (Group ID). For example, in the new WLAN standards, the STA may give up receiving a certain PPDU while not update the NAV thereof in the following two cases:

(1) the PPDU is an SU PPDU, the Group ID and the Partial AID in the physical frame thereof indicate that the STA cannot be the target recipient, that is, the Partial AID indicated in the radio frame is different from the Partial AID of the STA, or the Group ID in the radio frame is 0, but the STA is neither an AP, nor a Mesh STA. and (2) the PPDU is an MU PPDU, the STA is not in an MU group indicated by the Group ID in the frame; or the STA is in the MU group indicated by the Group ID in the frame, but the number of space time streams indicated at the position of the MU group in which the STA is located is 0.

In the prior art, although the case that an STA may give up receiving a PPDU while not update an NAV is defined, the receiving operation processing procedure of the STA which has the function of discarding a PPDU while not updating the NAV is not provided, therefore rendering the STA being unable to realise giving up the receiving of a PPDU while not updating an NAV. In addition, the prior art also fails to consider the problems that may appear after a PPDU being given up, which may cause the problems such as sending collisions. For example, in the case as shown in FIG. 1, a station B sends a radio frame to a station A, and C is an auditing station; since the station A and the station C are hidden stations to each other, the station C judges by detecting the PPDU that the PPDU sent by the station B does not contain data of itself, and the station C chooses to discard the PPDU while not update the NAV. When the station B finishes sending the PPDU, the station A will reply a response frame to the station B after a short interframe space (SIFS), whereas the station C neither updating the NAV thereof nor detecting the response frame signal sent by the station B will compete for the channel after the station B finishes sending; if the station C accesses the channel using a general competition accessing waiting time, and at this moment, the station A has not finished transmitting a response frame, then the station A and the station C are still sending simultaneously, thus the station B cannot receive accurately the response frame.

SUMMARY

The receiving operation processing procedure of an STA which has the function of giving up receiving a PPDU while not updating the NAV is not provided in the prior art, thereby rendering the problems such as the function of discarding a PPDU while not updating an NAV being unable to be realised or sending collisions; as regards these problems, the disclosure provides a solution for receiving radio frames and for channel access competition so as to solve at least one of the above-mentioned problems.

According to one aspect of the disclosure, a method for receiving the radio frame is provided, which comprises: if a first functional entity of a station detects that a channel signal intensity reaches a preset threshold, the first functional entity starting receiving the radio frame and sending an indication that a channel detection result is busy to a second functional entity of the station; if the first functional entity determines that the station is not a target station for receiving the radio frame, sending an indication of ending up receiving the radio frame to the second functional entity; and if transmission of the radio frame ends, the first functional entity sending an indication that the channel detection result is idle to the second functional entity.

Preferably, the first functional entity determining that the station is not the target station for receiving the radio frame comprises: if the first functional entity determines that identity identifying information indicated by the PPDU of the radio frame does not match the identity identifying information of the station with the first functional entity, or if a group identification indicated by the PPDU of the radio frame indicates that a target station for receiving the radio frame is an access point or a mesh station, and the station with the first functional entity is not an access point or an Mesh station, determining that the station with the first functional entity is not the target station for receiving the radio frame; or, if the first functional entity determines that a group corresponding to a group identification indicated by the PPDU of the radio frame is not a group in which the station with the first functional entity is located, or if the station with the first functional entity is located in the group and the number of space time streams indicated in the group indicates that the radio frame does not contain data of the station with the first functional entity, determining that the station with the first functional entity is not the target station for receiving the radio frame.

Preferably, the indication of ending up receiving the radio frame comprises: a reason of ending up receiving the radio frame or state information of ending up receiving the radio frame, wherein the reason of ending up receiving the radio frame or state information of ending up receiving the radio frame comprises one of the following: information of partial identity identification or information that group identifications does not match, or information that the station is not a target recipient, or information that the station actively discards the radio frame.

Preferably, if the first functional entity determines that the station is not the target station for receiving the radio frame, the method further comprises: the first functional entity determining, according to signalling indication information of the PPDU of the radio frame, a moment when transmission of the radio frame ends, and keeping the indication of the channel to be busy before the moment when the transmission of the radio frame ends.

Preferably, the first functional entity is configured to detect a signal intensity, receive and transmit the radio frame on a radio channel, and provide services to the second functional entity; and the second functional entity is configured to control an accessing of the first functional entity to the radio channel, receive and decode data units sent by the first functional entity, send the data units to the first functional entity and request services, and control virtual carrier detection.

According to another aspect of the disclosure, a method of channel access competition is provided, which comprises: a second functional entity of a station receiving an indication of ending up receiving a radio frame sent by a first functional entity of the station; the second functional entity determining that the station is not a target station for receiving the radio frame according to the indication of ending up receiving the radio frame; and the second functional entity receiving an indication sent by the first functional entity that a channel detection result is idle, and if channel access competition needs to be performed, then performing the channel access competition after waiting for a preset time period, wherein the preset time period is not less than one interframe space time.

Preferably, the indication of ending up receiving the radio frame comprises: a reason of ending up receiving the radio frame or state information of ending up receiving the radio frame, wherein the reason of ending up receiving the radio frame or state information of ending up receiving the radio frame comprises one of the following: information of partial identity identification or information that group identifications does not match, or information that the station is not a target recipient, or information that the station actively discards the radio frame.

Preferably, the one interframe space time is an extended interframe space time, wherein the extended interframe space time is a sum of one short interframe space time, one response frame transmission time and one interframe space time used in the case of an accurate frame being received.

Preferably, the response frame transmission time is the time calculated according to a lowermost rate in a rate set supported by the station and a predefined acknowledgement frame of the response frame.

Preferably, the indication of ending up receiving the radio frame further comprises: indication information of the response frame in response to the radio frame, wherein the indication information of the response frame comprises: indication information that whether the response frame is needed to respond the radio frame, and type information of the response frame in the case that it is necessary to respond to the response frame.

Preferably, if the indication information of the response frame indicates that the response frame is needed to respond to the radio frame, then the one interframe space time is the sum of one short interframe space time, one interframe space time used in the case of an accurate frame being received, and one the response frame transmission time; if the indication information of the response frame indicates that the response frame is not needed to respond the radio frame, then the one interframe space time is an interframe space time used in the case of an accurate frame being received.

Preferably, the response frame transmission time is a time determined according to a predefined rate and type information of the response frame.

According to another aspect of the disclosure, a device for receiving a radio frame is provided, which is located at the first functional entity of a station and comprises: a first sending module configured to start receiving the radio frame and send an indication that a channel detection result is busy to a second functional entity of the station when detecting that a channel signal intensity reaches a preset threshold; a first determining module configured to determine that the station is not a target station for receiving the radio frame; a second sending module configured to send an indication of ending up receiving the radio frame to the second functional entity when the first determining module determines that the station is not the target station for receiving the radio frame; and a third sending module configured to send an indication that a channel detection result is idle to the second functional entity when transmission of the radio frame ends.

Preferably, the first determining module comprises: a first determining unit configured to determine that the station with the first functional entity is not the target station for receiving the radio frame if it is determined that identity identifying information indicated by PHY Protocol Data Unit (PPDU) of the radio frame does not match identity identifying information of the station, or if a group identification indicated by the PPDU of the radio frame indicates that the target station for receiving the radio frame is an access point or a station in a wireless mesh network (mesh station) and the station with the first functional entity is not an access point or an Mesh station; a second determining unit configured to determine that the station with the first function entity is not the target station for receiving the radio frame if it is determined a group corresponding to the group identification indicated by the PPDU of the radio frame is not a group in which the station with the first functional entity is located, or if the station with the first functional entity is located in the group and the number of space time streams indicated in the group indicates that the radio frame does not contain data of the station with the first functional entity.

Preferably, the indication of ending up receiving the radio frame comprises: a reason of ending up receiving the radio frame or state information of ending up receiving the radio frame, wherein the reason of ending up receiving the radio frame or state information of ending up receiving the radio frame comprises one of the following: information of partial identity identification or information that group identifications does not match, or information that the station is not a target recipient, or information that the station actively discards the radio frame.

Preferably, a second determining module configured to, when the first determining module determines that the station is not the target station for receiving the radio frame, determine a moment when transmission of the radio frame ends according to signalling indication information of the PPDU of the radio frame, and keep the indication of the channel to be busy before the moment when the transmission of the radio frame ends.

According to still another aspect of the disclosure, a device of channel access competition is provided, which is located at the second functional entity of a station and comprises: a first receiving module configured to receive an indication of ending up receiving a radio frame sent by a first functional entity of the station; a determining module configured to determine that the station is not a target station for receiving the radio frame according to the indication of ending up receiving the radio frame; a second receiving module configured to receive an indication that a channel detection result is idle sent by the first functional entity; and an accessing module configured to perform channel access competition after waiting for a preset time period when the channel access competition needs to be performed, wherein the preset time period is not less than one interframe space time.

Preferably, the indication of ending up receiving the radio frame comprises: a reason of ending up receiving the radio frame or state information of ending up receiving the radio frame, wherein the reason of ending up receiving the radio frame or state information of ending up receiving the radio frame comprises one of the following: information of partial identity identification or information that group identifications does not match, or information that the station is not a target recipient, or information that the station actively discards the radio frame.

Preferably, the one interframe space time is an extended interframe space time, wherein the extended interframe space time is the sum of one short interframe space time, one response frame transmission time and one interframe space time used in the case of an accurate frame being received.

Preferably, the indication of ending up receiving the radio frame further comprises: indication information of the response frame in response to the radio frame, wherein the indication information of the response frame comprises: indication information that whether the response frame is needed to respond the radio frame, and type information of the response frame in the case that it is necessary to respond to the response frame.

Preferably, if the indication information of the response frame indicates that the response frame is needed to respond to the radio frame, then the one interframe space time is the sum of one short interframe space time, one interframe space time used in the case of an accurate frame being received, and one the response frame transmission time; if the indication information of the response frame indicates that the radio frame does not contain the response frame, then the one interframe space time is an interframe space time used in the case of an accurate frame being received.

According to still another aspect of the disclosure, a station is provided which comprises: a first sending module configured to start receiving the radio frame and send an indication that a channel detection result is busy to the device of channel access competition when detecting that a channel signal intensity reaches a preset threshold; a first determining module configured to determine that the station is not a target station for receiving of the radio frame; a second sending module configured to send an indication of ending up receiving the radio frame to the device of channel access competition when the first determining module determines that the station is not the target station for receiving the radio frame; and a third sending module configured to send an indication that a channel detection result is idle to the device of channel access competition when transmission of the radio frame ends; and the device of channel access competition comprises: a first receiving module configured to receive an indication of ending up receiving the radio frame sent by the device for receiving the radio frame; a determining module configured to determine that the station is not a target station for receiving the radio frame according to the indication of ending up receiving the radio frame; a second receiving module configured to receive an indication that a channel detection result is idle sent by the device for receiving the radio frame; and an accessing module configured to perform channel access competition after waiting for a preset time period when the channel access competition needs to be performed, wherein the preset time period is not less than one interframe space time.

Preferably, the first determining module comprises: a first determining unit configured to that the station with the first functional entity is not the target station for receiving the radio frame if it is determined that identity identifying information indicated by PHY Protocol Data Unit (PPDU) of the radio frame does not match identity identifying information of the station, or if a group identification indicated by the PPDU of the radio frame indicates that the target station for receiving the radio frame is an access point or a station in a wireless mesh network (mesh station) and the station with the first functional entity is not an access point or an Mesh station; a second determining unit configured to determine that the station with the first function entity is not the target station for receiving the radio frame if it is determined a group corresponding to the group identification indicated by the PPDU of the radio frame is not a group in which the station with the first functional entity is located, or if the station with the first functional entity is located in the group and the number of space time streams indicated in the group indicates that the radio frame does not contain data of the station with the first functional entity.

Preferably, the device for receiving the radio frame further comprises: a second determining module configured to, when the first determining module determines that the station is not the target station for receiving the radio frame, determine a moment when transmission of the radio frame ends according to signalling indication information of the PPDU of the radio frame, and keep the indication of the channel to be busy before the moment when the transmission of the radio frame ends.

Preferably, the indication of ending up receiving the radio frame comprises: a reason of ending up receiving the radio frame or state information of ending up receiving the radio frame, wherein the reason of ending up receiving the radio frame or state information of ending up receiving the radio frame comprises one of the following: information of partial identity identification or information that group identifications does not match, or information that the station is not a target recipient, or information that the station actively discards the radio frame.

Preferably, the one interframe space time is an extended interframe space time, wherein the extended interframe space time is a sum of one short interframe space time, one response frame transmission time and one interframe space time used in the case of an accurate frame being received.

Preferably, the indication of ending up receiving the radio frame further comprises: indication information of the response frame in response to the radio frame, wherein the indication information of the response frame comprises: indication information that whether the response frame is needed to respond the radio frame, and type information of the response frame in the case that it is necessary to respond to the response frame.

Preferably, if the indication information of the response frame indicates that the response frame is needed to respond to the radio frame, then the one interframe space time is the sum of one short interframe space time, one interframe space time used in the case of an accurate frame being received, and one the response frame transmission time; if the indication information of the response frame indicates that the radio frame does not contain the response frame, then the one interframe space time is an interframe space time used in the case of an accurate frame being received.

In the disclosure, the first functional entity of the station starts receiving the radio frame and send the indication that the channel detection result is busy to the second functional entity of the station when detecting that a channel signal intensity reaches a preset threshold; the first functional entity sends the indication of ending up receiving the radio frame to the second functional entity when determining that the station is not a target station for receiving the radio frame; and when transmission of the radio frame ends, the first functional entity sends an indication that the channel detection result is idle to the second functional entity. Though the above-mentioned solution, a receiving operation processing procedure of a station which has the function of discarding the radio frame while not updating the NAV is provided.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The preferred embodiments are described in conjunction with the drawings as follows. It should be noted that the embodiments and the characteristics of the embodiments can be combined with each other if no conflict is caused.

Embodiment 1

According to an embodiment of the disclosure, a method for receiving a radio frame is provided, and a receiving operation processing procedure of the STA which has the function of discarding a PPDU while not updating the NAV is provided, thereby realising the method of giving up the receiving of the PPDU while not updating the NAV.

Figure 3:
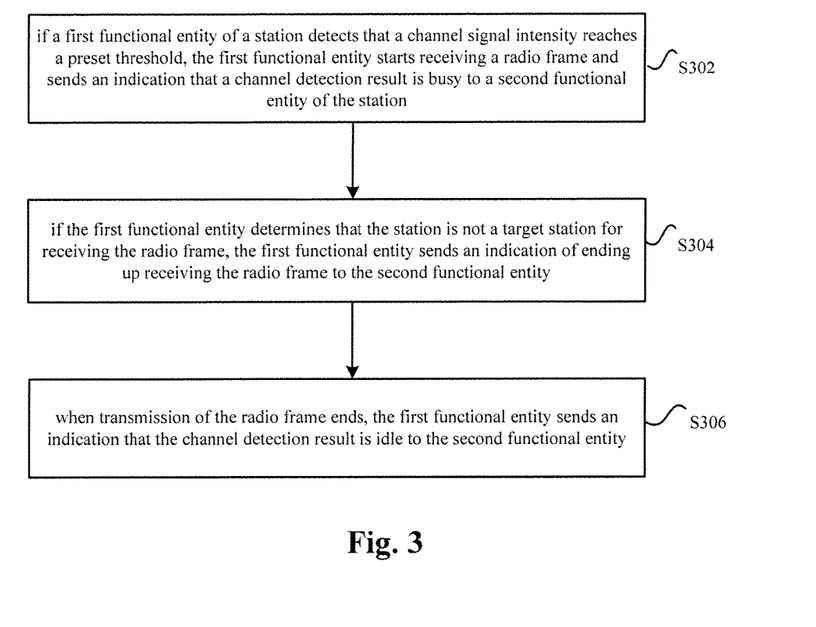
FIG. 3 is a flow chart of a method for receiving a radio frame according to an embodiment of the disclosure.

FIG. 3 is a flow chart of a method for receiving a radio frame according to an embodiment of the disclosure; as shown in FIG. 3, the method may comprise the following steps (step S302 to step S306).

Step S302, if a first functional entity of a station detects that a channel signal intensity reaches a preset threshold, the first functional entity starts receiving a radio frame and sends an indication that a channel detection result is busy to a second functional entity of the station.

Step S304, if the first functional entity determines that the station is not a target station for receiving the radio frame, the first functional entity sends an indication of ending up receiving the radio frame to the second functional entity.

Step S306, when transmission of the radio frame ends, the first functional entity sends an indication that the channel detection result is idle to the second functional entity.

In the embodiment of the disclosure, if the first functional entity of the station detects that a channel signal intensity reaches a preset threshold, the first functional entity of the station starts receiving the radio frame and sends the indication that the channel detection result is busy to the second functional entity of the station; the first functional entity sends an indication of ending up receiving the radio frame to the second functional entity when determining that the station is not a target station for receiving the radio frame; and when the transmission of the radio frame ends, the first functional entity sends an indication that the channel detection result is idle to the second functional entity. Therefore, a receiving operation processing procedure of a station which has the function of discarding the radio frame while not updating the NAV is provided.

In a preferred embodiment of the disclosure, the first functional entity may determine that the station is not a target station for receiving the radio frame under the following conditions: if the first functional entity determines that the identity identifying information indicated by the PPDU of the radio frame does not match identity identifying information of the station, or group identification indicated by the PPDU of the radio frame indicates that a target station for receiving the radio frame is an access point or a Mesh station and the station with the first functional entity is not an access point or a Mesh station, then it may be determined that the station with the first functional entity is not the target station for receiving the radio frame; or, if the first functional entity determines that a group corresponding to a group identification indicated by the PPDU of the radio frame is not a group in which the station is located, or if the station is located in the group and the number of space time streams indicated in the group indicates that the radio frame does not contain data of the station, then it is determined that the station with first functional entity is not the target station for receiving the radio frame.

For example, when the station detects that the channel becomes busy, then the first functional entity generates an indication that the channel is busy to the second functional entity, and starts receiving the training sequence and the signalling domain of the radio frame header; the PPDU is an SU VHT PPDU after successively decoding the L-SIG and VHT-SIG-A of the SU/MU VHT PPDU of the radio frame; the Partial AID indicated in the radio frame is different from the Partial AID of the station, or the Group ID in the radio frame is 0, that is, indicating that the target station for receiving the radio frame is an access point or a Mesh station, but the station with the first functional entity is not an access point or a Mesh station, then the first functional entity determines that the station with the first functional entity is not the target station of the radio frame; or, if the PPDU is an MU VHT PPDU, the station is not in an MU group indicated by the Group ID in the frame, or the station is in the MU group indicated by the Group ID in the frame, but the number of space time streams indicated at the position of the MU group in which the station is located is 0, that is, indicating that the radio frame does not contain the data of the station, then the first functional entity determines that the station with the first functional entity is not the target station for receiving the radio frame.

The first functional entity may send an indication of ending up receiving the radio frame to the second functional entity when the first functional entity determines that the station is not a target station for receiving the radio frame. In a preferred embodiment of the disclosure, the indication of ending up receiving the radio frame may comprise but not be limited to: a reason of ending up receiving the radio frame or state information of ending up receiving the radio frame, wherein the reason of ending up receiving the radio frame or state information of ending up receiving the radio frame comprises one of the following: information of partial identity identification or information that group identifications does not match, or information that the station is not a target recipient, or information that the station actively discards the radio frame, etc. In the embodiments of the disclosure, the reason of ending up receiving the radio frame or state information of ending up receiving the radio frame is used for indicating that the station is not the target station for receiving the radio frame, which may be expressed via different meanings but is not limited to the above-mentioned expression modes in the embodiments of the disclosure.

For example, if the station chooses not to receive or to discard the SU/MU PPDU of the radio frame, then the first functional entity of the station should generate an indication of ending up receiving the radio frame (PHY-RXEND indication), wherein the PHY-RXEND indication should indicate the reason or the choice for discarding the PPDU to the second functional entity, for example, the PHY-RXEND indication may contain a parameter RXERROR indicating whether the PPDU receives accurately, and the RXERROR may be set to be values similar to partial relevant identification or group identification not matching (PAIDorGID-notMatch) or the station not being a target recipient (notRecipient), and so on.

After the first functional entity sends the indication of ending up receiving the radio frame to the second functional entity, when transmission of the radio frame ends, the first functional entity may send an indication that the channel detection result is idle to the second functional entity. The time length for ending the radio frame transmission may be determined according to the signalling indication information of the PPDU of the radio frame, therefore, in a preferred embodiment of the disclosure, when determining that the station is not a target station for receiving the radio frame, the first functional entity may determine, according to the signalling indication information of the PPDU of the radio frame, the moment when the transmission of the radio frame ends, and keeps the indication of the channel to be busy before the moment when the transmission of the radio frame ends. For example, the first functional entity may determine the moment when the transmission of the radio frame ends in L-SIG of SU/MU VHT PPDU of the radio frame.

In the above-mentioned embodiment, after receiving the indication of ending up receiving the radio frame sent by the first functional entity, the second functional entity judges that the current station is not the target station for receiving the radio frame according to the indication of ending up receiving the radio frame; and after receiving the indication sent by the first functional entity that the channel detection result is idle, if channel access competition needs to be performed, then the channel access competition is performed after waiting for a preset time period, wherein the preset time period of waiting is not less than one interframe space time, so that collisions caused by the auditing stations and other stations sending radio frames to the same station simultaneously may be avoided.

In a preferred embodiment of the disclosure, the first functional entity may be configured to detect signal intensity, receive and send radio frames on a wireless channel, interact with the second functional entity and provide services to the second functional entity so as to realise the function of the physical layer; and the second functional entity is configured to control the access of the first functional entity to the wireless channel, receive and decode data units sent by the first functional entity, send the data units to the first functional entity and request services, and control virtual carrier detection so as to realise the function of the media access control layer. In the actual application, the first functional entity is equivalent to the physical layer of the station and the second functional entity is equivalent to the media access control layer of the station.

According to an embodiment of the disclosure, a device for receiving a radio frame is provided, which is located at the first functional entity of a station and is used for realising the method provided by the above-mentioned embodiments of the disclosure.

Figure 4:
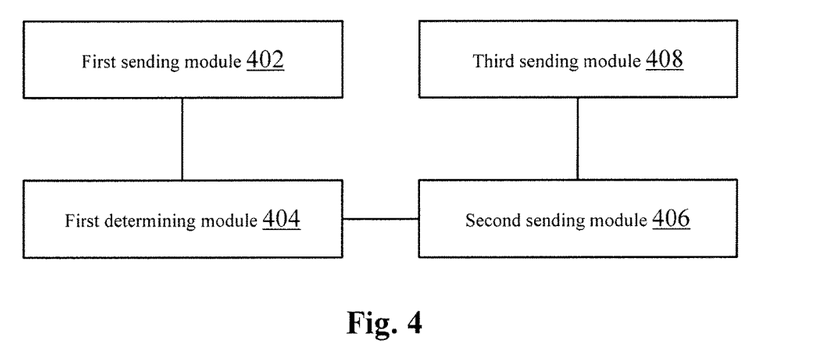
FIG. 4 is a diagram of a device for receiving a radio frame according to an embodiment of the disclosure.

FIG. 4 is a diagram of a device for receiving a radio frame according to an embodiment of the disclosure; as shown in FIG. 4, the device mainly comprises: a first sending module 402, a first determining module 404, a second sending module 406 and a third sending module 408, wherein the first sending module 402 is configured to start receiving a radio frame and send an indication that a channel detection result is busy to the second functional entity of the station when detecting that a channel signal intensity reaches a preset threshold; the first determining module 404 is coupled to the first sending module 402 and is configured to determine that the station is not a target station for receiving the radio frame; a second sending module 406 is coupled to the first determining module 404 and is configured to send an indication of ending up receiving the radio frame to the second functional entity when the first determining module 404 determines that the station is not a target station for receiving the radio frame; and a third sending module 408 is coupled to the second sending module 406 and is configured to send an indication that the channel detection result is idle to the second functional entity when transmission of the radio frame ends.

In the embodiment of the disclosure, the first sending module 402 detects that the channel signal intensity reaches the preset threshold, starts receiving the radio frame and send an indication that a channel detection result is busy to a second functional entity of the station; when the first determining module 404 determines that the station is not a target station for receiving the radio frame, the second sending module 406 sends the indication of ending up receiving the radio frame to the second functional entity; when the transmission of the radio frame ends, the third sending module 408 sends the indication that the channel detection result is idle to the second functional entity. Therefore, a receiving operation processing procedure of a station which has the function of discarding the radio frame while not updating the NAV is provided.

Figure 5:
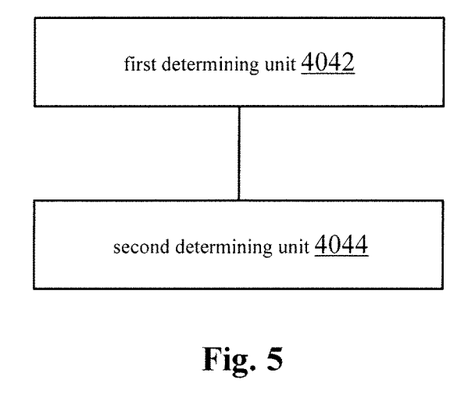
FIG. 5 shows a diagram of a preferred determining module according to an embodiment of the disclosure.

FIG. 5 shows a diagram of a preferred determining module according to an embodiment of the disclosure, as shown in FIG. 5, the first determining module may comprise a first determining unit 4042 configured to determine that identity identifying information indicated by the PPDU of the radio frame does not match the identity identifying information of the station, or a group identification indicated by the PPDU of the radio frame indicates that a target station for receiving the radio frame is an access point or a Mesh station, whereas the station is not an access point or a Mesh station, then it may be determined that the station is not the target station for receiving the radio frame; a second determining unit 4044 configured to determine that a group corresponding to a group identification indicated by the PPDU of the radio frame is not a group in which the station is located, or when the station is located in the group indicated by the group identification, the number of space time streams indicated in the group indicates that the radio frame does not contain data of the station, then it is determined that the station is not the target station for receiving the radio frame.

In a preferred embodiment of the disclosure, the indication of ending up receiving the radio frame sent by the second sending module 406 may comprise: a reason of ending up receiving the radio frame or state information of ending up receiving the radio frame, wherein the reason of ending up receiving the radio frame or state information of ending up receiving the radio frame may comprise: the partial identity identification or information that group identifications do not match (partial identity identification or group identification indicated by the PPDU of the radio frame do not match the identity identifying information of the station), or information that the station is not a target recipient, or information that the station actively discards the radio frame, etc. In the embodiments of the disclosure, the reason of ending up receiving the radio frame or state information of ending up receiving the radio frame is set to indicate that the station is not the target station for receiving the radio frame, which may be expressed via different meanings but is not limited to the above-mentioned expression modes in the embodiments of the disclosure.

Figure 6:
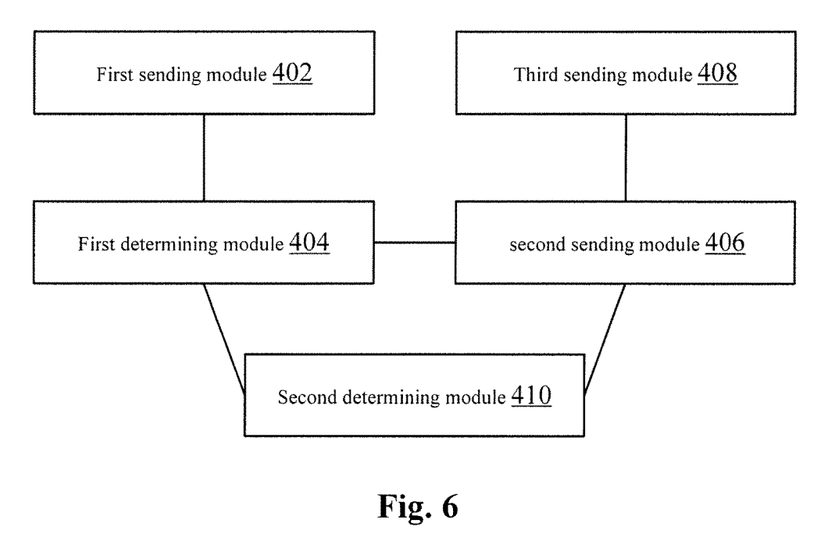
FIG. 6 is a diagram of a preferred device for receiving a radio frame according to an embodiment of the disclosure.

After the first functional entity sends the indication of ending up receiving the radio frame to the second functional entity, when transmission of the radio frame ends, the first functional entity may send an indication that the channel detection result is idle to the second functional entity, and keep the indication of the channel to be busy before the transmission of the radio frame ends. The time length for finishing the radio frame transmission may be determined according to the signalling indication information of the PPDU of the radio frame, therefore, in a preferred embodiment of the disclosure, as shown in FIG. 6, the device may further comprise: the second determining module 410 configured to determine, when the first determining module 404 determines that the station is not a target station for receiving the radio frame, the moment when the transmission of the radio frame ends according to the signalling indication information of the PPDU of the radio frame, and keeps the indication of the channel to be busy before the moment when the transmission of the radio frame ends.

Embodiment 2

According to an embodiment of the disclosure, a method of channel access competition is provided, wherein the method may be used in coordination with the above-mentioned method for receiving the radio frame.

Figure 7:
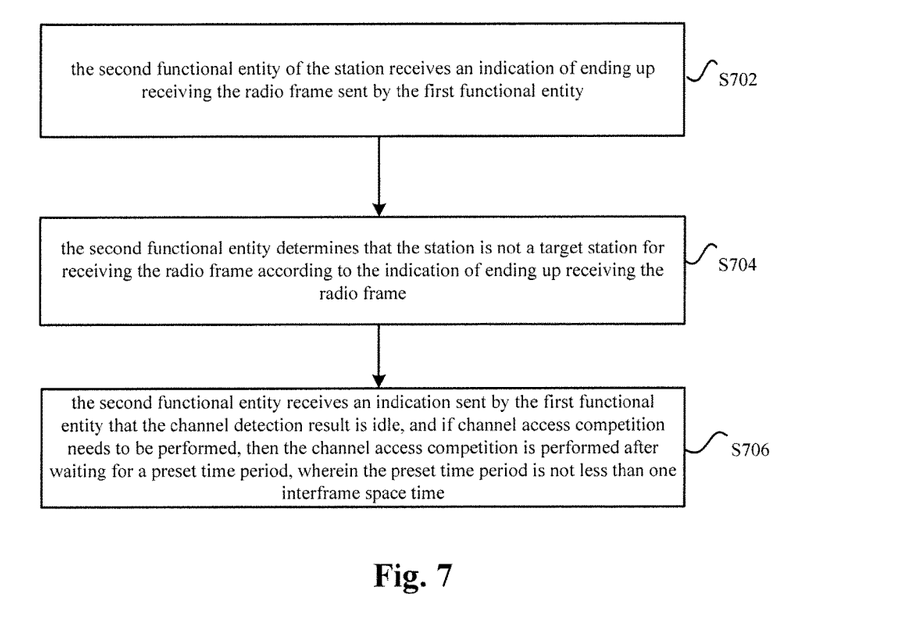
FIG. 7 is a flow chart of a method of channel access competition according to an embodiment of the disclosure.

FIG. 7 is a flow chart of a method of channel access competition according to an embodiment of the disclosure; as shown in FIG. 7, the method may comprise the following steps (step S702 to step S706).

Step S702, the second functional entity of the station receives an indication of ending up receiving the radio frame sent by the first functional entity.

Step S704, the second functional entity determines that the station is not a target station for receiving the radio frame according to the indication of ending up receiving the radio frame.

And S706, the second functional entity receives an indication sent by the first functional entity that the channel detection result is idle, and if channel access competition needs to be performed, then the channel access competition is performed after waiting for a preset time period, wherein the preset time period is not less than one interframe space time.

In the embodiment of the disclosure, the second functional entity of the station receives an indication of ending up receiving the radio frame sent by the first functional entity, and determines that the station is not a target station for receiving the radio frame according to the indication of ending up receiving the radio frame; and the second functional entity receives an indication sent by the first functional entity that the channel detection result is idle, and if the channel access competition needs to be performed, then the channel access competition is performed after waiting for a preset time period which is not less than one interframe space time, so that collisions caused by the auditing stations and other stations sending radio frames to the same station simultaneously is avoided.

In a preferred embodiment of the disclosure, the indication of ending up receiving the radio frame sent by the first functional entity may comprise: the reason of ending up receiving the radio frame or state information of ending up receiving the radio frame. If the station is not the target station for receiving the radio frame and the predefined operation of the first functional entity is to discard the above-mentioned radio frame, the reason of ending up receiving the radio frame or state information of ending up receiving the radio frame may comprise: partial identity identification or information that group identification indicated by the PPDU of the radio frame does not match the identity identifying information of the station (partial identity identification or group identification does not match), or information that the station is not a target recipient, or information that the station actively discards the radio frame, etc. In the embodiment of the disclosure, the reason of ending up receiving the radio frame or state information of ending up receiving the radio frame is used for indicating that the station is not the target station for receiving the radio frame, which may be expressed via different meanings but is not limited to the above-mentioned expression modes in the embodiments of the disclosure.

The second functional entity may determine the waiting time for the station competing for the wireless channel according to the reason of ending up receiving the radio frame or state information of ending up receiving the radio frame. For example, the indication of ending up receiving the radio frame (PHY-RXEND. indication) received by the second functional entity contains a parameter RXERROR indicating whether the PPDU is received accurately, and the RXERROR is set to be a value similar to the PAIDorGID-notMatch or the notRecipient, and so on. When a channel detecting state indication becomes idle and the channel state is idle and the channel access competition needs to be performed, the channel access competition is performed after waiting for a time period corresponding to the reason of ending up receiving the radio frame.

In another preferred embodiment of the embodiment of the disclosure, when the reason of ending up receiving the radio frame or the state information of ending up receiving the radio frame is not the receiving being no error, one interframe space time is one extended interframe space time, wherein the extended interframe space time is the sum of one short interframe space time, one response frame transmission time and one interframe space time used in the case of an accurate frame being received (i.e., a common interframe space time); when the station receives the radio frame of which the target recipient is itself and the radio frame needs immediate response, the above-mentioned short interframe space is the interframe space between the sent response frame and the received radio frame; and the above-mentioned common interframe space is the interframe space used when stating to compete for the channel after receiving the accurate frame. Preferably, the above-mentioned response frame transmission time refers to a response frame transmission time calculated using a lowermost rate in a rate set supported by the station and a predefined acknowledgement frame ACK of the response frame.

Figure 8:
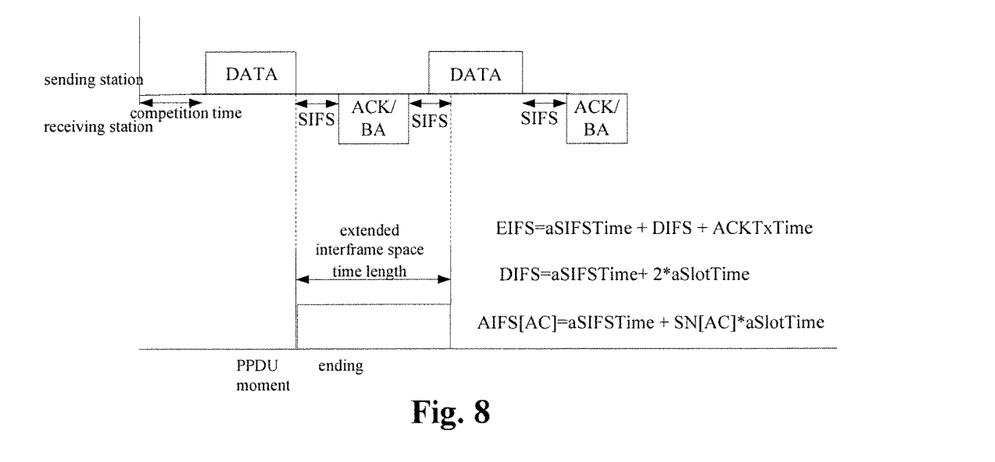
FIG. 8 shows a diagram of the time length of the extended interframe space according to an embodiment of the disclosure.

For example, after receiving a PHY-RXEND indication of which the RXERROR value is not NoError, the second functional entity uses an extended interframe space to compete for access when the channel detecting state indication becomes idle. FIG. 8 shows a diagram of the time length of the extended interframe space according to an embodiment of the disclosure. As shown in FIG. 8, the extended interframe space is EIFS under the DCF, and the extended interframe space is EIFS−DIFS+AIFS[AC] in the EDCA mode.

Further, the indication of ending up receiving the radio frame may also comprise: indication information of the response frame in response to the radio frame, wherein the indication information of the response frame may comprise: the indication information that whether the response frame is needed to respond to the radio frame, and type information of the response frame in the case that it is necessary to respond to the response frame. In a preferred embodiment of the embodiment of the disclosure, if the indication information of the response frame indicates that the radio frame contains a response frame, then the preset time period may be the sum of one short interframe space time, one interframe space time used in the case of an accurate frame being received, and one response frame transmission time; or if the indication information of the response frame indicates that the response frame is not needed to respond to the radio frame, then the preset time period is one interframe space time used in the case of an accurate frame being received.

For example, the second functional entity receives an indication of ending up receiving the radio frame of which the value is similar to an AIDorGIDnotMatch or notRecipient. If the indication of ending up receiving the radio frame does not comprise an indication of the response frame of the current PPDU, then the EIFS or EIFS−DIFS+AIFS[AC] is used when competing for accessing; or if the indication of ending up receiving the radio frame contains the indication information of the response frame of the current PPDU, then the interframe space used is aSIFSTime+xIFS+ACKTxTime, wherein aSIFSTime is the short interframe space time specified by the protocol, xIFS is the normal interframe space defined by the protocol which is used by a competing accessing entity when receiving the accurate frame, and ACKTxTime is an estimated response frame transmission time, with different response frame types having different values; when indicating that the current PPDU does not have a radio frame, the interframe space used may be xIFS, that is, not comprising aSIFSTime and ACKTxTime.

According to the embodiment of the disclosure, a device of channel access competition is provided, which is located at the second functional entity of the station and is configured to realise the method of channel access competition provided by the above-mentioned embodiment of the disclosure.

Figure 9:
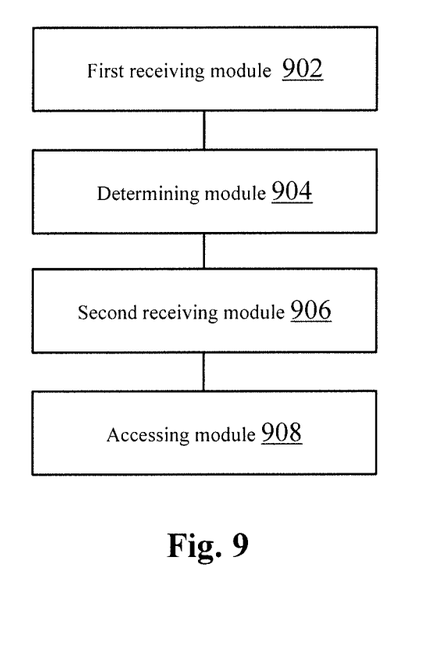
FIG. 9 is a diagram of a device of channel access competition according to an embodiment of the disclosure.

FIG. 9 is a diagram of a device of channel access competition according to an embodiment of the disclosure; as shown in FIG. 9, the device mainly comprises: a first receiving module 902, a determining module 904, a second receiving module 906 and an accessing module 908, wherein the first receiving module 902 is configured to receive the indication of ending up receiving the radio frame sent by the first functional entity; the determining module 904 is coupled with the first receiving module 902 and is configured to determine that the station is not the target station for receiving the radio frame according to the indication of ending up receiving the radio frame; the second receiving module 906 is configured to receive the indication sent by the first functional entity that the channel detection result is idle; and the accessing module 908 is coupled with the second receiving module and is configured to perform channel access competition after waiting for the preset time period if the channel access competition needs to be performed, wherein the preset time period is not less than one interframe space time.

In the embodiment of the disclosure, the first receiving module 902 of the second functional entity of the station receives an indication of ending up receiving the radio frame sent by the first functional entity of the station, and the determining module 904 determines that the station is not the target station for receiving the radio frame according to the indication of ending up receiving the radio frame; and the second receiving module 906 receives an indication sent by the first functional entity that the channel detection result is idle, and if the channel access competition needs to be performed, then the accessing module 908 performs the channel access competition after waiting for a preset time period which is not less than one interframe space time, so that collisions caused by the auditing stations and other stations sending radio frames to the same station simultaneously is avoided.

In a preferred embodiment of the disclosure, the indication of ending up receiving the radio frame received by the first receiving module 902 may comprise: the reason of ending up receiving the radio frame or state information of ending up receiving the radio frame, wherein the reason of ending up receiving the radio frame or the state information of ending up receiving the radio frame may comprise: partial identity identification or information that group identification indicated by the PPDU of the radio frame does not match the identity identifying information of the station (partial identity identification or group identification not matching), or information that the station is not a target recipient, or information that the station actively discards the frame, etc. In the embodiment of the disclosure, the reason of ending up receiving the radio frame or state information of ending up receiving the radio frame is set to indicate that the station is not the target station for receiving the radio frame, which may be expressed via different meanings but is not limited to the above-mentioned expression modes in the embodiments of the disclosure.

In another preferred embodiment of the disclosure, when the reason of ending up receiving the radio frame or the state information of ending up receiving the radio frame is not the receiving being noerror, one interframe space time is one extended interframe space time, wherein the extended interframe space time is the sum of one short interframe space time, one response frame transmission time and one common interframe space time (i.e., one interframe space time used in the case of an accurate frame being received). At this moment, after waiting for an extended interframe space time period, the accessing module 908 performs the channel access competition.

Further, the indication of ending up receiving the radio frame further received by the first receiving module 902 may also comprise: the indication information of the response frame in response to the radio frame, wherein the indication information of the response frame may comprise: the indication information that whether the response frame is needed to respond to the radio frame, and the type information of the response frame in the case that it is necessary to respond to the response frame. In a preferred embodiment of the embodiment of the disclosure, if the indication information of the response frame indicates that the response frame is needed to respond to the radio frame, then one interframe space time may be the sum of one short interframe space time, one interframe space time used in the case of an accurate frame being received, and one the response frame transmission time; or if the indication information of the response frame indicates that the response frame is not needed to respond to the radio frame, then the one interframe space time may be one interframe space time used in the case of an accurate frame being received.

Embodiment 3

The embodiment of the disclosure provides a method for receiving the radio frame for the case that when the wireless station judges by detecting the PPDU of the radio frame that the present station is not the recipient of the current radio frame, the wireless station may discard the radio frame while not update the NAV thereof, and the specific method is as follows.

When the station detects that the channel signal intensity reaches a preset threshold, the first functional entity sends an indication that a channel detection result is busy to the second functional entity, and starts to detect the PPDU sequence and the signalling indication information of the radio frame; when the station is not a target station for receiving the radio frame, then the first functional entity of the station sends an indication of ending up receiving the radio frame to the second functional entity; and the first functional entity sends an indication that the channel detection result is idle to the second functional entity at the moment when transmission of the radio frame ends.

In a preferred embodiment of the disclosure, the indication of ending up receiving the radio frame may carry the reason of ending up receiving the radio frame or state information of ending up receiving the radio frame, wherein the reason or state information of ending up receiving the radio frame is partial identity identification or information that the group identification does not match, information that the station is not a target recipient, or information that the station actively discarding the frame. When being not the target station for receiving of the radio frame, the station may choose according to the predefined operation of the station to receive or discard the radio frame.

The above-mentioned first functional entity may be configured to detect the signal intensity, receive and send radio frames on a wireless channel, interact with the second functional entity and provide services to the second functional entity. The second functional entity may be configured to control the accessing of the station to the wireless channel.

The moment when the above-mentioned radio frame transmission ends is acquired from the signalling indication information in the frame header of the above-mentioned radio frame. The station keeps the wireless channel indication to be busy during the above-mentioned radio frame transmission time period.

The second functional entity receives the indication of ending up receiving the radio frame of the radio frame sent by the first functional entity, and performs the channel access competition process when the channel state indication is idle, wherein the waiting time before accessing the channel is not less than the interframe space time.

When the reason or state indicated by the indication of ending up receiving the radio frame of the radio frame sent by the above-mentioned first functional entity is not noerror, the above-mentioned interframe space time is one extended interframe space, wherein the extended interframe space comprises one short interframe space plus one response frame transmission time plus one common interframe space.

The reason or state indicated by the indication of ending up receiving the radio frame sent by the above-mentioned first functional entity is partial identity identification and information that the group identifications do not match, information that the station is not a target recipient, or information that the station actively discards the frame.

Embodiment 4

The embodiment of the disclosure takes the first functional entity being located at the physical layer and the second functional entity being at the MAC layer as an example to describe the method provided in the embodiment of the disclosure.

After acquiring the transmission opportunity, a sending station STA1 sends SU VHT PPDU or MU VHT PPDU, supposing that the STA2 is a receiving station and the STA3 is an auditing station, that is, the above-mentioned sent SU/MU VHT PPDU does not contain data sent to the STA3. When sending the above-mentioned SU/MU VHT PPDU, the STA1 will carry the indication information in the L-SIG part of the PPDU, and the transmission time of the PPDU may be obtained via the indication information. In addition, the above-mentioned PPDU carries the Group ID and Partial AID information in the PPDU VHT-SIG-A, wherein the information may indicate that whether the PPDU is an SU PPDU or MU PPDU, the partial identity identification of the target station for receiving and the number of space time streams of each MU user in the current MU PPDU when it is MU PPDU.

When the STA3 detects that the channel becomes busy, then the physical layer generates an indication that the channel is busy to the MAC layer, starts receiving the training sequence and the signalling domain of the radio frame header, and finds that the STA3 is not the target recipient after successfully decoding the L-SIG and VHT-SIG-A of the SU/MU VHT PPDU sent by the above-mentioned STA1; that is, the STA3 may choose not to receive or to discard the PPDU in one of the following two cases:

(1) the PPDU is an SU VHT PPDU, the Partial AID indicated in the frame is different from the Partial AID of the STA3, or the Group ID in the frame indicates to be 0, but the STA3 is neither an AP, nor a Mesh STA; and (2) the PPDU is an MU VHT PPDU, the STA3 is not in an MU group indicated by the Group ID in the frame; or the STA3 is in the MU group indicated by the Group ID in the frame, but the number of space time streams indicated at the position of the MU group corresponding to the STA3 in the current MU PPDU is 0.

Figure 10:
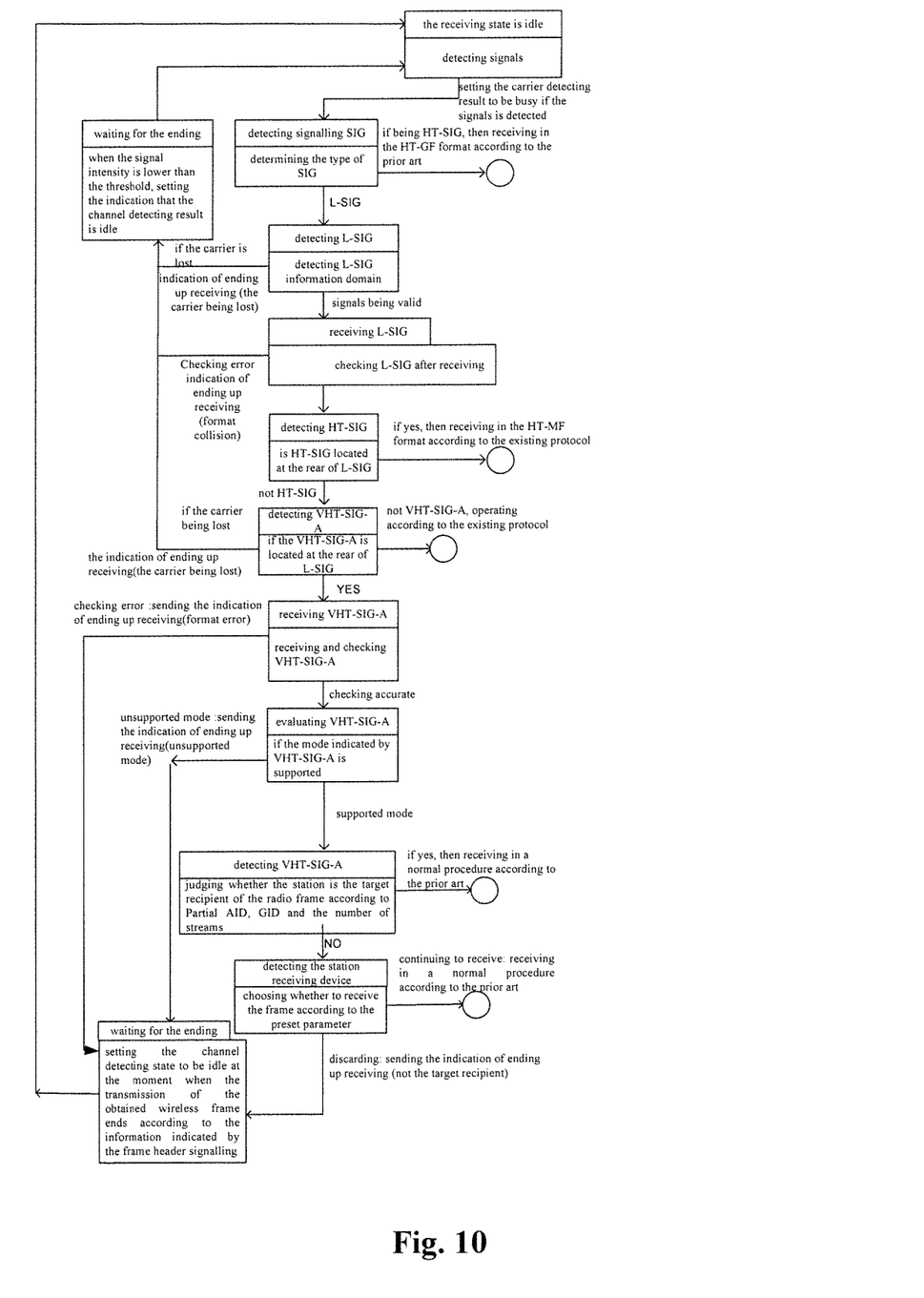
FIG. 10 is a diagram of a method for receiving a radio frame according to an embodiment of the disclosure.

If the STA3 chooses not to receive or to discard the SU/MU VHT PPDU in the above-mentioned case, then the physical layer entity of the STA3 should generate an indication of ending up receiving the radio frame (PHY-RXEND indication), wherein the PHY-RXEND indication should indicate the reason or the choice for discarding the PPDU to the MAC layer, for example, the PHY-RXEND indication may contain a parameter RXERROR indicating whether the PPDU receives accurately, and the RXERROR may be set to be a value similar to PAIDorGIDnotMatch or notRecipient, etc., instead of the NoError; and the physical layer should keep the channel state indication to be busy (BUSY) in the PPDU transmission period obtained in the L-SIG, and the channel detecting state indication is idle at the moment when the PPDU transmission ends. The method for receiving the radio frame procedure is as shown in FIG. 10.

After the competition access function DCF or EDCAF of the MAC layer receives a PHY-RXEND indication with the RXERROR value thereof being not the NoError, the extended interframe space should be used to perform the competition access process when the channel detecting state indication becomes idle. As shown in FIG. 8, the extended interframe space is EIFS in the DCF mode, and the extended interframe space is EIFS−DIFS+AIFS[AC] in the EDCA mode.

Embodiment 5

The embodiment of the disclosure takes the first functional entity being located at the physical layer and the second functional entity being at the MAC layer as an example to describe the method provided in the embodiment of the disclosure.

After acquiring the transmission opportunity, a sending station STA1 sends SU PPDU or MU PPDU, supposing that the STA2 is a receiving station and the STA3 is an auditing station, that is, the above-mentioned sent SU/MU PPDU does not contain data sent to the STA3. When sending the above-mentioned SU/MU PPDU, the STA1 will carry the indication information in the SIG signalling part of the PPDU, and the transmission time of the PPDU may be obtained via the indication information, and whether the PPDU is an SU PPDU or MU PPDU may be learned via the encoding mode or the information indication of the SIG, and the group indication information (Group ID) and/or the partial identity identification (PartialAID) information may also be contained, wherein the information may indicate the PPDU, the partial identity identification of the target station for receiving and the number of space time streams of each MU user in the current MU PPDU when it is MU PPDU. In addition, the information about the response frame of the PPDU may also be comprised, that is, whether there is a response frame and the type of the response frame, etc.

When the STA3 detects that the channel becomes busy, then the physical layer generates an indication that the channel is busy to the MAC layer, starts receiving the training sequence and the signalling domain of the radio frame header, and finds that itself is not the target recipient after successfully decoding the signalling SIG of the SU/MU PPDU sent by the above-mentioned STA1; that is, the STA3 may choose not to receive or to discard the PPDU.

If the STA3 chooses not to receive or to discard the SU/MU PPDU in the above-mentioned case, then the physical layer entity of the STA3 should generate an indication of ending up receiving the radio frame (PHY-RXEND indication), wherein the PHY-RXEND indication should indicate the reason or the choice for discarding the PPDU to the second functional entity. For example, the PHY-RXEND indication may contain a parameter RXERROR indicating whether the PPDU receives accurately, and the RXERROR may be set to be a value similar to PAIDorGIDnotMatch or notRecipient, etc., instead of NoError; and the physical layer should keep the channel state indication to be busy (BUSY) in the PPDU transmission period obtained in the L-SIG, and the channel detecting state indication is idle at the moment when the PPDU transmission ends. In addition, the PHY-RXEND indication may further comprise the indication information of the response frame in response to the current PPDU.

The competition access function DCF or EDCAF of the MAC layer receives a PHY-RXEND indication with the RXERROR value being not NoError but value similar to such as AIDorGIDnotMatch or notRecipient, if the PHY-RXEND indication does not comprise an indication of the response frame in response to the current PPDU, then the EIFS or EIFS−DIFS+AIFS[AC] is used when competing for accessing; or if the PHY-RXEND indication contains the indication information of the response frame in response to the current PPDU, then the interframe space used is aSIF-STime+xIFS+ACKTxTime, wherein aSIFSTime is the short interframe space time specified by the protocol, xIFS is the normal interframe space defined by the protocol which is used by a competing accessing entity when receiving the accurate frame, and ACKTxTime is an estimated response frame transmission time, with different response frame types having different values; when indicating that the current PPDU does not have a radio frame, the interframe space used may be xIFS, that is, not comprising aSIFSTime and ACKTxTime. In addition, if the PHY-RXEND indication indicates that the transmission opportunity corresponding to the current frame has not finished with subsequent frames to be sent, then the auditing station may perform channel accessing only when the transmission opportunity indication indicates the transmission ends.

According to the embodiment of the disclosure, a station is provided, which comprises a device for receiving the radio frame and a device of channel access competition provided by the above-mentioned embodiments of the disclosure. The device for receiving the radio frame and the device of channel access competition may use the structure as described in the above-mentioned embodiments, which have the features as described in the above-mentioned embodiments, which will not be repeated here.

It can be seen from the above description that the disclosure realises the following technical effects: the first functional entity of the station starts receiving the radio frame and sends an indication that a channel detection result is busy to a second functional entity of the station when detecting that a channel signal intensity reaches a preset threshold; the first functional entity sends an indication of ending up receiving the radio frame to the second functional entity when determining that the station is not a target station for receiving the radio frame; and when transmission of the radio frame ends, the first functional entity sends an indication that the channel detection result is idle to the second functional entity. Therefore, a receiving operation processing procedure of a station which has the function of discarding the radio frame while not updating the NAV is provided. The second functional entity of the station receives an indication of ending up receiving the radio frame sent by the first functional entity, and determines that the station is not a target station for receiving the radio frame according to the indication of ending up receiving the radio frame; and the second functional entity receives an indication sent by the first functional entity that the channel detection result is idle, and performs the channel access competition after waiting for a preset time period which is not less than one interframe space time, so that collisions caused by the auditing stations and other stations sending radio frames to the same station simultaneously is avoided.

Apparently, those skilled in the art shall understand that the above modules and steps of the disclosure can be realized by using general purpose calculating device, can be integrated in one calculating device or distributed on a network which consists of a plurality of calculating devices, and alternatively they can be realized by using the executable program code of the calculating device, so that consequently they can be stored in the storing device and executed by the calculating device, in some cases, can perform the shown or described step in sequence other than herein, or they are made into integrated circuit module respectively, or a plurality of modules or steps thereof are made into one integrated circuit module. In this way, the disclosure is not restricted to any particular hardware and software combination.

The above description is only preferred embodiments of the disclosure and is not intended to limit the disclosure, and the disclosure can have a variety of changes and modifications for ordinary person skilled in the field. Any modification, equivalent replacement, or improvement made within the spirit and principle of the disclosure shall all fall within the protection scope of the disclosure.

What is claimed is:

1. A device of channel access competition, wherein the device is located at the second functional entity of a station and comprises: a hardware processor, configured with a memory and configured to execute program instructions stored on the memory, wherein the program instructions comprise:
   receiving an indication of ending up receiving a radio frame sent by a first functional entity of the station;
   determining that the station is not a target station for receiving the radio frame according to the indication of ending up receiving the radio frame;
   receiving an indication that a channel detection result is idle sent by the first functional entity; and
   performing channel access competition after waiting for a preset time period when the channel access competition needs to be performed, wherein the preset time period is not less than one interframe space time;
   wherein the first functional entity is a physical layer of the station and the second functional entity is a media access control layer of the station;
   wherein the indication of ending up receiving the radio frame comprises: a reason of ending up receiving the radio frame or state information of ending up receiving the radio frame, wherein the reason of ending up receiving the radio frame or state information of ending up receiving the radio frame comprises one of the following: information of partial identity identification or information that group identifications do not match, or information that the station is not a target recipient, or information that the station actively discards the radio frame.

2. The device according to claim 1, wherein the one interframe space time is an extended interframe space time, wherein the extended interframe space time is a sum of one short interframe space time, one response frame transmission time and one interframe space time used in the case of an accurate frame being received.

3. The device according to claim 2, wherein the indication of ending up receiving the radio frame further comprises: indication information of the response frame in response to the radio frame, wherein the indication information of the response frame comprises: indication information that whether the response frame is needed to respond the radio frame, and type information of the response frame in the case that it is necessary to respond to the response frame.

4. The device according to claim 3, wherein
   if the indication information of the response frame indicates that the response frame is needed to respond to the radio frame, then the one interframe space time is the sum of one short interframe space time, one interframe space time used in the case of an accurate frame being received, and one the response frame transmission time;
   if the indication information of the response frame indicates that the radio frame does not contain the response frame, then the one interframe space time is an interframe space time used in the case of an accurate frame being received.

5. A method of channel access competition, comprising:
   a second functional entity of a station receiving an indication of ending up receiving a radio frame sent by a first functional entity of the station;
   the second functional entity determining that the station is not a target station for receiving the radio frame according to the indication of ending up receiving the radio frame; and
   the second functional entity receiving an indication sent by the first functional entity that a channel detection result is idle, and if channel access competition needs to be performed, then performing the channel access competition after waiting for a preset time period, wherein the preset time period is not less than one interframe space time; wherein the first functional entity is a physical layer of the station and the second functional entity is a media access control layer of the station;
   wherein the indication of ending up receiving the radio frame comprises: a reason of ending up receiving the radio frame or state information of ending up receiving the radio frame, wherein the reason of ending up receiving the radio frame or state information of ending up receiving the radio frame comprises one of the following: information of partial identity identification or information that group identifications do not match, or information that the station is not a target recipient, or information that the station actively discards the radio frame.

6. The method according to claim 5, wherein the indication of ending up receiving the radio frame further comprises: indication information of the response frame in response to the radio frame, wherein the indication information of the response frame comprises: indication information that whether the response frame is needed to respond the radio frame, and type information of the response frame in the case that it is necessary to respond to the response frame.

7. The method according to claim 6, wherein
   if the indication information of the response frame indicates that the response frame is needed to respond to the radio frame, then the one interframe space time is the sum of one short interframe space time, one interframe space time used in the case of an accurate frame being received, and one the response frame transmission time;
   if the indication information of the response frame indicates that the response frame is not needed to respond the radio frame, then the one interframe space time is an interframe space time used in the case of an accurate frame being received.

8. The method according to claim 5, wherein the one interframe space time is an extended interframe space time, wherein the extended interframe space time is a sum of one short interframe space time, one response frame transmission time and one interframe space time used in the case of an accurate frame being received.

9. A method for receiving a radio frame, comprising:
   if a first functional entity of a station detects that a channel signal intensity reaches a preset threshold, the first functional entity starting receiving the radio frame and sending an indication that a channel detection result is busy to a second functional entity of the station;
   if the first functional entity determines that the station is not a target station for receiving the radio frame, the first functional entity sending an indication of ending up receiving the radio frame to the second functional entity; and if transmission of the radio frame ends, the first functional entity sending an indication that the channel detection result is idle to the second functional entity;

wherein the first functional entity is a physical layer of the station and the second functional entity is a media access control layer of the station;

wherein the indication of ending up receiving the radio frame comprises: a reason of ending up receiving the radio frame or state information of ending up receiving the radio frame, wherein the reason of ending up receiving the radio frame or state information of ending up receiving the radio frame comprises one of the following: information of partial identity identification or information that group identifications do not match, or information that the station is not a target recipient, or information that the station actively discards the radio frame.

10. The method according to claim 9, wherein the first functional entity determining that the station is not the target station for receiving the radio frame comprises:

if the first functional entity determines that identity identifying information indicated by a PHY Protocol Data Unit (PPDU) of the radio frame does not match identity identifying information of the station with the first functional entity, or if a group identification indicated by the PPDU of the radio frame indicates that the target station for receiving the radio frame is an access point or a station of a wireless mesh network (mesh station), and the station with the first functional entity is not an access point or a mesh station, the first functional entity determining that the station with the first functional entity is not the target station for receiving the radio frame; or if the first functional entity determines that a group corresponding to the group identification indicated by the PPDU of the radio frame is not a group in which the station with the first functional entity is located, or if the station with the first function entity is located in the group and the number of space time streams indicated in the group indicates that the radio frame does not contain data of the station with the first function entity, determining that the station with the first function entity is not the target station for receiving the radio frame.

11. The method according to claim 9, wherein if the first functional entity determines that the station is not the target station for receiving the radio frame, the method further comprises:

the first functional entity determining, according to signalling indication information of the PPDU of the radio frame, a moment when transmission of the radio frame ends, and keeping the indication of the channel to be busy before the moment when the transmission of the radio frame ends.

12. A device for receiving a radio frame, wherein the device is located at a first functional entity of a station and comprises: a hardware processor, configured with a memory and configured to execute program instructions stored on the memory, wherein the program instructions comprise:

receiving the radio frame and sending an indication that a channel detection result is busy to a second functional entity of the station when detecting that a channel signal intensity reaches a preset threshold;

determining that the station is not a target station for receiving the radio frame;

sending an indication of ending up receiving the radio frame to the second functional entity when determining that the station is not the target station for receiving the radio frame; and sending an indication that a channel detection result is idle to the second functional entity when transmission of the radio frame ends;

wherein the first functional entity is a physical layer of the station and the second functional entity is a media access control layer of the station;

wherein the indication of ending up receiving the radio frame comprises: a reason of ending up receiving the radio frame or state information of ending up receiving the radio frame, wherein the reason of ending up receiving the radio frame or state information of ending up receiving the radio frame comprises one of the following: information of partial identity identification or information that group identifications does not match, or information that the station is not a target recipient, or information that the station actively discards the radio frame.

13. The device according to claim 12, wherein the program instructions comprise:

determining that the station with the first functional entity is not the target station for receiving the radio frame if it is determined that identity identifying information indicated by PHY Protocol Data Unit (PPDU) of the radio frame does not match identity identifying information of the station, or if a group identification indicated by the PPDU of the radio frame indicates that the target station for receiving the radio frame is an access point or a station in a wireless mesh network (mesh station) and the station with the first functional entity is not an access point or an Mesh station;

determining that the station with the first function entity is not the target station for receiving the radio frame if it is determined a group corresponding to the group identification indicated by the PPDU of the radio frame is not a group in which the station with the first functional entity is located, or if the station with the first functional entity is located in the group and the number of space time streams indicated in the group indicates that the radio frame does not contain data of the station with the first functional entity.

14. The device according to claim 12, wherein the program instructions comprise:

when determining that the station is not the target station for receiving the radio frame, determining a moment when transmission of the radio frame ends according to signalling indication information of the PPDU of the radio frame, and keeping the indication of the channel to be busy before the moment when the transmission of the radio frame ends.

* * * * *